June 4, 1940.  H. J. KERR  2,203,357
PRESSURE VESSEL CONNECTION
Filed Oct. 8, 1938  3 Sheets-Sheet 1
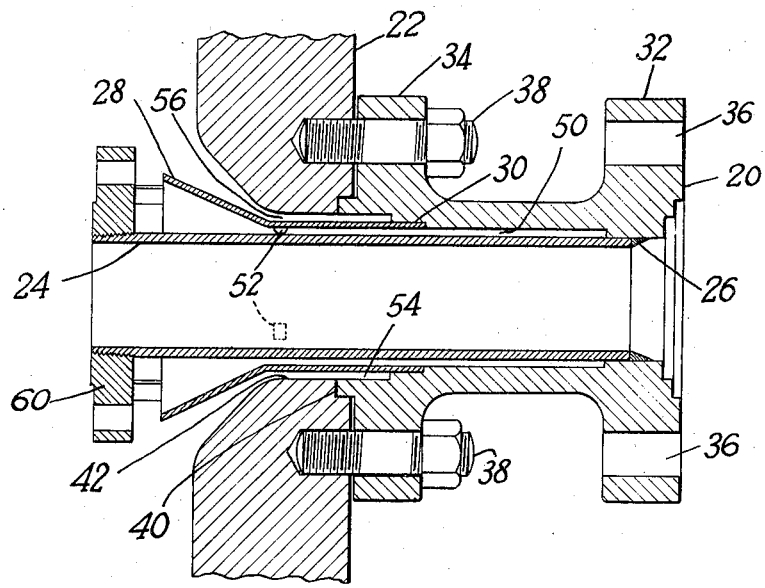
Fig. 3
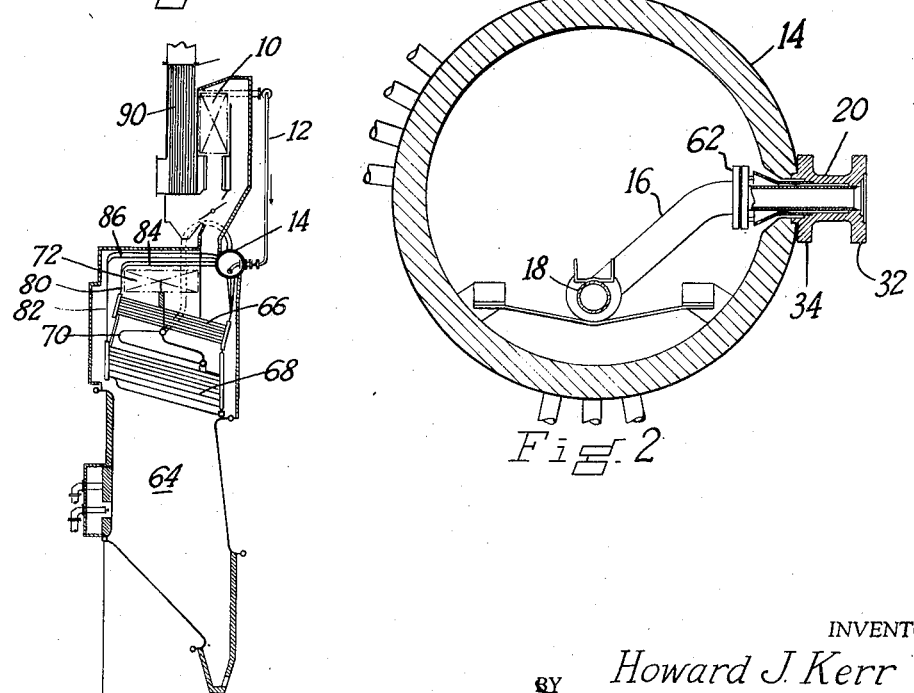
Fig. 1
Fig. 2
INVENTOR.
Howard J. Kerr
BY
ATTORNEY.

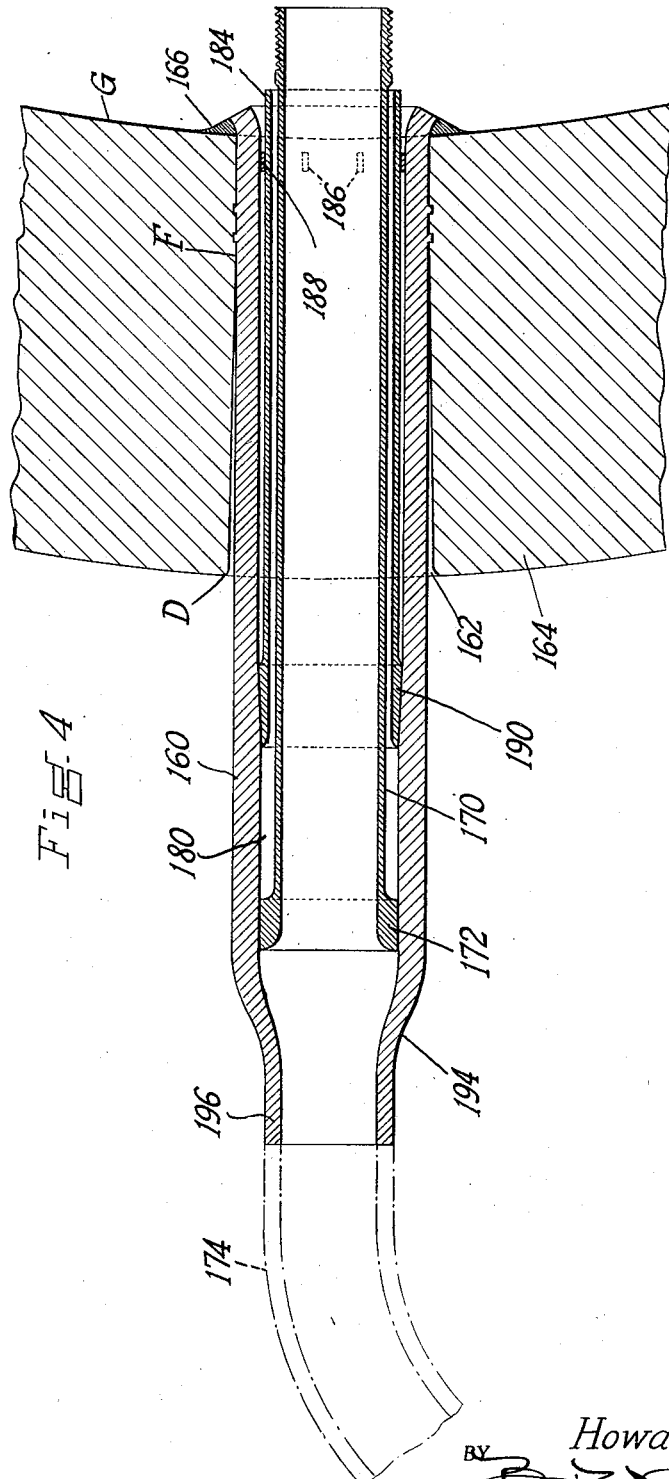

June 4, 1940.                   H. J. KERR                   2,203,357
                        PRESSURE VESSEL CONNECTION
                          Filed Oct. 8, 1938              3 Sheets-Sheet 3

INVENTOR.
Howard J. Kerr
BY
ATTORNEY.

Patented June 4, 1940

2,203,357

UNITED STATES PATENT OFFICE 2,203,357

PRESSURE VESSEL CONNECTION

Howard J. Kerr, Westfield, N. J., assignor to The Babcock & Wilcox Company, Newark, N. J., a corporation of New Jersey Application October 8, 1938, Serial No. 233,916

7 Claims. (Cl. 122—365)

This invention relates to tubular connections for pressure vessels and it is considered as exemplified in tubular connections to the drums of fluid heat exchange apparatus such as vapor generators operating at high temperatures and high pressures. Such generators usually include a drum which must have thick walls to withstand the operating pressure, and when such a drum receives a fluid of different temperature through a tubular connection the temperature differential between the latter fluid and main body of fluid within the drum often sets up damaging stresses in the drum metal about the connection. When such conditions are long continued, cracks appear in the drum metal, weakening the drum and necessitating extensive repairs. Such results are often aggravated when the fluid also has a corrosive effect upon the drum metal.

In pressure vessels of the character referred to, for high pressure, for instance, above 600 lbs. per square inch, the walls are of metal of high tensile strength and of substantial thickness, even when of moderate diameter, and of equal thickness for lower pressure and larger drum diameter. Tubes or connections are required to supply fluid to, or withdraw it from, such pressure vessels in service, and the fluid flowing through such connections may have substantially lower or higher temperature than that contained in the pressure vessel.

The temperature of the metal shell of the pressure vessel is normally that of the fluid contained in it, especially when there is external insulation, and the temperature of the metal of the tube or pipe conveying fluid to, through, or from the vessel is similarly that of the fluid flowing in it, or very nearly so. The metal of the connecting tube and that of the vessel walls are in contact at the junction which in high pressure work is a joint that is rolled, welded, or flanged, and the metal of the tube may extend wholly through the hole in the vessel wall, or only partly through and perhaps not at all. When the tube does not extend wholly through the hole, the flowing fluid will come into direct contact with the metal of the wall of the pressure vessel and tend to give it the fluid temperature at the contact surface, unless means are provided to prevent such contact.

When the flowing fluid has a different temperature than that of the fluid in the vessel steadily or momentarily, the tube metal in contact with the flowing fluid will have a different temperature than the metal of the vessel wall, and the metal of higher temperature will have expanded more than the other. This relative expansion will have a bad effect on the joint between the two metal parts. For example, if the tube is steadily conveying a fluid to the vessel and the flowing fluid is colder than the main body of fluid within the vessel, the tube metal will contract relative to that of the vessel and damage to the connection will result. A tube expanded into a hole in the vessel wall will act this way. In such a joint, and under these steady conditions, there will be a flow of heat from the hotter metal of the vessel wall to the colder metal of the tube in contact with it, so that the metal of the tube at this zone will not be as cold as the fluid flowing inside of it. However, if the fluid entering through the tube, suddenly becomes colder than that in the vessel, especially if, at the same time its flow rate also increases, then the tube metal will suddenly cool and contract because of lack of time for heat flow from the vessel wall to the tube metal to compensate, and leak conditions will result. Such leak conditions with high pressure fluid will increase and may become permanent because of the erosive effect of such escaping fluid on the surrounding metal.

In addition to the bad effect on joints between tube and vessel metal arising from different fluid temperatures, especially when there is a sudden change in that of the flowing fluid, there is another sort of bad effect that may result and this is an excessive stress in the metal of the vessel that may cause a crack or a rupture. An example of such a condition arises when the fluid entering the vessel is much hotter or much colder than the fluid in the vessel so that there is a temperature gradient and a heat flow in the metal of the vessel wall around the tube hole radially away from the hole, or toward it. When the metal of the vessel wall is colder at the hole than at a distance from it, the metal at the hole is contracted relative to that at a distance, and thus a tension stress is set up, more severe, the greater the radial temperature gradient, that is, the greater the temperature difference per inch of distance. Such a tension stress may exceed the resistance of the metal and produce a crack. Contrariwise as to temperature difference, a higher temperature in the flowing fluid will cause the metal of the vessel wall to expand at the hole relative to the metal at a distance, and a crushing stress will be set up, which may exceed the metal resistance, and a crack will result later when the metal cools.

Such stresses beyond the elastic limit of the metal are serious, and may be more serious than the leaks due to relative expansion of the two metals at a joint. Some joints between the metal of the tube and that of the vessel wall are of the metallically integral type produced for example by fusion welding. Relative expansion of the two metals thus joined may result in an excessive stress in the junction metal and cause the joint to fail, independent of damage to the metal of the vessel wall or that of the tube. Such failures are doubly serious as to the operativeness and safety of such structures.

When such tubular connections supply feed water to the steam and water drum of a high pressure steam boiler and extend through the steam space of the drum, there exists a set of conditions particularly favorable to the production of the above indicated undesirable results. This is particularly true when the metal is highly stressed and simultaneously exposed to pure condensate.

The problem of supplying safer equipment for the foregoing condition of service is solved in the present instance by a construction which minimizes the damaging temperature differentials and thus accomplishes a controlled relative expansion and contraction such as to materially reduce the liability of leakage or cracking due to stresses and in most cases to entirely prevent leakage and failure of the metal.

Other objects of the invention will appear as the accompanying description proceeds.

The invention will be described with reference to preferred embodiments which are indicated in the accompanying drawings.

In the drawings:

Fig. 1 is a vertical section of a vapor generator operating at high pressures and high temperatures;

Fig. 2 is a vertical section of a high pressure steam and water drum such as that included in the Fig. 1 installation, with an embodiment of the invention associated therewith;

Fig. 3 is an enlarged scale section of the drum and tube connection indicated in Fig. 2 of the drawings;

Fig. 4 is a vertical section through a drum and tube connection adapted for operation with a steam generator operating at pressures in excess of 2000 lbs. per sq. inch;

Figure 5:
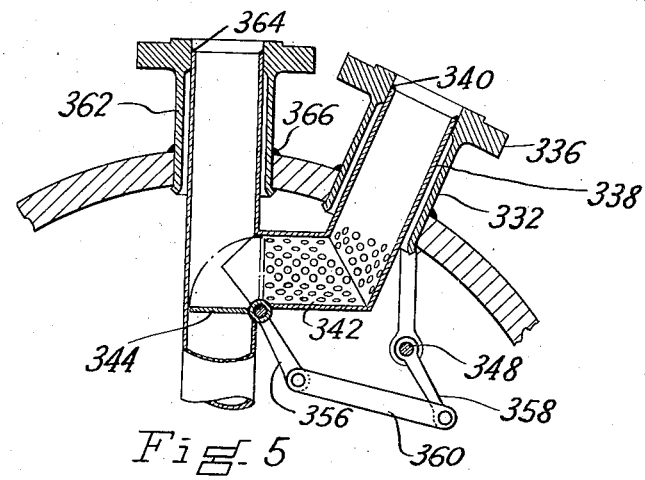
Fig. 5 is a vertical section through drum connections which exemplify a further embodiment of the invention.

Fig. 1 of the drawings indicates a steam generating installation in which feed water from the economizer 10 passes through the conduit 12 to a steam and water drum 14. This installation operates at steam pressures in excess of 1000 lbs. per sq. inch, necessitating a steam and water drum with heavy walls. The particular drum 14 has a diameter of 57½ inches and has walls with a thickness in excess of 4¾ inches. The steam in the drum has a temperature of about 545° F.

The conduit 12 conducts the discharge from the economizer 10 to the drum 14 and enters the drum horizontally as indicated in Figs. 1 and 2 of the drawings. The position of this connection is also such that at least a part of it is above the water level of the drum for considerable periods of time. The internal feed pipe 16 is in communication with the conduit 12 and extends downwardly within the drum to the horizontally extending pipe 18 through which feed water is distributed longitudinally in the drum.

The tubular drum connection by which the conduit 12 communicates with the feed pipe 16 is particularly indicated in Fig. 3 of the drawings. As here shown, this connection includes a flanged external sleeve or nozzle 20 rigidly connected to the drum wall 22, the primary ferrule or internal sleeve 24 welded at 26 to the outer end of the nozzle 20, and the funnel ended intermediate sleeve 28 expanded into or otherwise secured in good heat transfer relationship with the nozzle 20 as indicated at 30 near its inner end. The nozzle is of relatively heavy construction for resisting high internal pressure and has a heavy external flange 32 with a similar flange 34 at the drum end of the nozzle. Each flange is manufactured with a circumferential row of bolt holes indicated at 36. The flange 34 is shown secured to the drum wall 22 by means of the stud bolts 38 screw-threaded into the drum wall as shown. The flange 34 is preferably formed with a circular boss 40 fitting within and seating on a similarly shaped recess formed in the edge of the drum opening 42.

It is important to avoid excessive stresses in the drum metal around the opening through which the sleeves 24 and 28 extend, and to this end it is desirable that the metal of the nozzle or external sleeve 20 in contact with, or adjacent the metal of the drum wall 22 be substantially at the temperature of the main body of fluid within the drum and that of the drum metal itself. Hence, for example, when the temperature of the fluid flowing through the primary ferrule or sleeve 24 is substantially lower than the temperature of the main body of fluid within the drum (for example, 300° F. lower), there is a temperature difference of similar magnitude between the end of the sleeve 20 remote from the drum and that portion of it in contact with or adjacent the drum. This result is accomplished by the construction.

The sleeve 24 is spaced internally from the main bore or internal surface of the sleeve 20 so as to form an annular chamber 50 in free communication with the fluid in the drum. This construction permits the higher temperature fluid within the drum to enter the annular space 50 and thus increase materially the temperature of the intermediate portions of the sleeve 20 to approximately the temperature of the drum.

The secondary, or funnel sleeve 28, being in free contact on both sides with the higher temperature fluid within the drum at its funnel end and in good heat transfer relationship with an intermediate portion of the sleeve 20 at its outer end, acts to transfer heat to the metal of the sleeve 20 at the junction and permits of direct contact of internal fluid with the drum end of the sleeve. The thermal difference between the ends of the sleeve 20 is thus brought to an approximation of the temperature difference between the fluid within the drum and that entering the sleeve.

The sleeve 28 is held in concentric relation to the sleeve 24 by circumferentially arranged spacers 52 which may be formed by weld metal deposited on the internal surface of the sleeve 28. This sleeve is further held in concentric relation to the walls of the drum opening and the walls of the circumferential recess 54 formed within the drum end of the sleeve 20. Thus, a second annular chamber 56 is formed externally of the sleeve 28, and into this chamber the fluid from the drum is free to flow so as to transmit heat to the inner end of the sleeve 20 and bring the temperature of that portion of the sleeve up to the temperature of the fluid within the drum.

When the drum and tube connection indicated in Fig. 3 is so located in the drum wall that it is above the water level of the drum, steam will enter the annular chamber 50 and be condensed therein by the cooling effect of the fluid flowing through the internal sleeve 24. Such condensate has an undesirable chemical effect upon the drum metal when in a stressed condition, and particularly the metal about the opening through which the tubular connection communicates with the interior of the drum. The illustrative construction is so arranged as to prevent the contact of such condensate with this part of the drum metal and thus prevent damage to the latter. Such condensate flows along the lower surface of the funnel sleeve 28, and is guided by the funnel end of that sleeve to a position where it falls into the main body of water within the drum without contacting the drum metal immediately around the drum connection. The funnel sleeve 28 thus accomplishes the double result of arresting corrosive difficulties and assisting in the elimination of destructive temperature created stresses in the metal of the drum about the feed water opening therein.

It will be understood, of course, that the flange 32 cooperates with a similar flange upon the end of the conduit 12 so that the latter may be secured to the drum connection in a fluid tight union. Similarly, the inner end of the sleeve 24 is provided with a flange 60 which is secured in similar manner to a like flange 62 on the inner end of the inner feed pipe 16.

Aside from the composite elements above referred to, the steam generating installation in Fig. 1 includes the furnace 64, the upper and lower banks of inclined steam generating tubes 66 and 68, the superheater 70, and the reheater 72. The corresponding lower ends of the steam generating tubes of the banks 66 and 68 are connected with the water space of the drum 14, and their corresponding upper ends are connected by the risers 80 and 82 to the horizontal circulators 84 and 86, in communication with the steam space of the drum 14. Also, the installation includes, beyond the economizer 10, an air heater 90.

Fig. 4 illustrates a drum and tube connection adapted to be employed in connection with the steam and water drum of a vapor generator operating at pressures as high as 2200 lb. per square inch for which the temperature of saturated steam is about 650° F. This connection includes the tube 160 extending through an opening 162 into the wall 164 of the steam and water drum. The tube is expanded into the tube seat only at the inner end of the latter, the tube relatively loosely fitting within the tube seat from the position D to the position F. Between the latter and the inner surface G of the drum the tube may be expanded into the tube seat so as to form a pressure tight joint. The circumferential seal weld 166 additionally insures that there will be no leak in the drum and tube connection.

Within the tube 160 there is a primary sleeve 170 having an integral ring or collar 172 tightly fitting within the tube. This sleeve extends from a position several tube diameters outwardly of the drum to a position beyond the inner end of the tube within the drum, and it receives the feed water or other low temperature fluid flowing through the conduit 174 into the drum.

The sleeve 170 is of considerably smaller diameter than the inside diameter of the tube 160, and when arranged as shown, there is an annular fluid chamber 180 between the sleeve and the tube. Beyond an outer part of this chamber there is a secondary sleeve 184 mounted in telescopic relation to the sleeve 170 and held in position by the circumferential spacers 186 and 188.

The outer end of the sleeve 184 has an integral collar or ring 190 fitting tightly against the walls of the tube 160. The sleeve or collar 190 may be formed with a conical contour so that it may have a tight driven fit with a part of the inner surface of the tube 160 of complementary form.

The outer end of the tube 160 may be tapered as indicated at 194 so that its extreme outer end 196 will have a diameter equal to the conduit 174. It is preferably welded to the conduit at this position.

Figure 6:
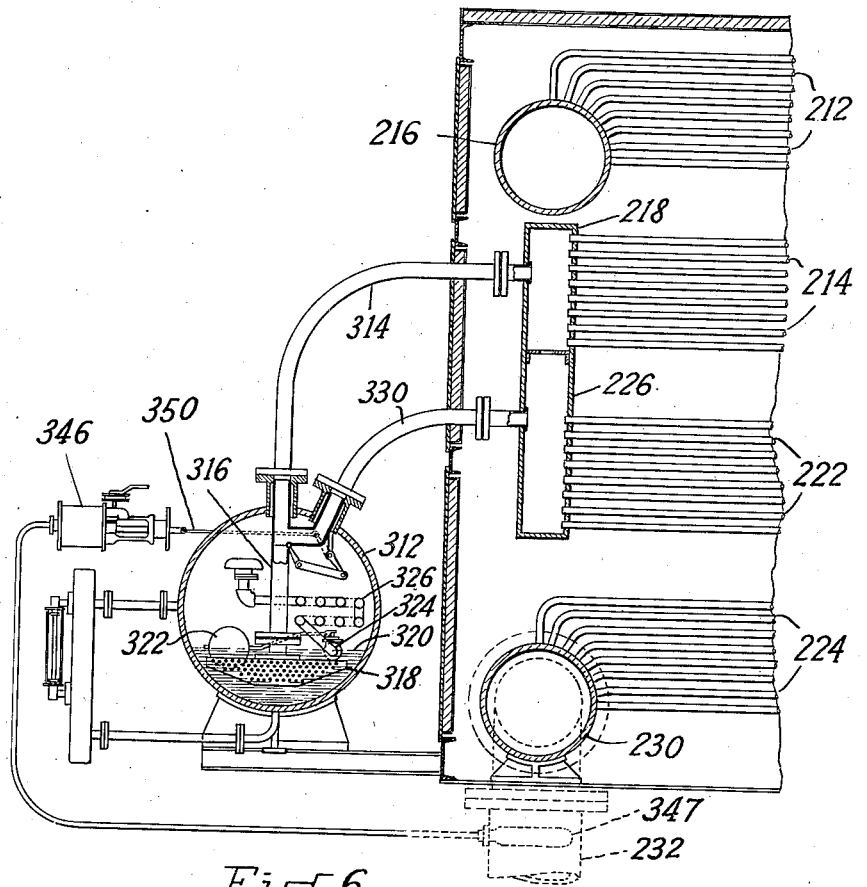
Fig. 6 is a vertical sectional view showing how the Fig. 5 embodiment is utilized in a high pressure and high temperature fluid system.

The disclosure indicated in Figs. 5 and 6 of the drawings is identical with part of the disclosure of applicant's co-pending application, Serial No. 735,780, filed July 18, 1934, now Patent No. 2,133,991, and to that extent the present application may be regarded as a continuation in-part of the earlier application.

The embodiment of the invention indicated in Fig. 5 of the drawings is utilized in connection with the fluid heat exchange apparatus indicated in Fig. 6. In this apparatus, steam enters the inlet header 216 of a low temperature superheater including the tubes 212 and 214 which extend across the path of the furnace gases. The steam passes through the tubes 212 and then through the tubes 214 to an intermediate header 218 from which the steam passes through connections 314 and 330 to another superheater section including the inlet header 226 and the end connected tubes 222 and 224. The latter are subjected to furnace gases at a higher temperature and the steam passing from the tubes 222 and then through the tubes 224 to the superheater outlet 230 is superheated to a high degree by those gases. The steam leaving the superheater header 218 may pass to the desuperheater chamber 312 through a plurality of conduits 314. Internal upright tubes 316 constitute substantial extensions of the conduits 314 and are arranged within the desuperheater chamber as indicated in the drawings. At the lower ends of these tubes there are disposed steam distributing manifolds 318 positioned beneath the water level 320 which is maintained by a feed water regulator 322. The latter is disposed in a line 324 leading to the feed water heater 326. The chamber 312 has saturated steam above the water level and the drum metal has the same temperature. Steam more or less desuperheated is led directly from the desuperheater chamber 312 to the inlet chambers 226 of the high temperature superheater through conduits 330 which are connected to the tubes 316 within the desuperheater chamber as clearly indicated in Fig. 5 of the drawings. This figure discloses flanged tubular drum connectors 332 preferably expanded into suitable seats within the wall of the desuperheater chamber 312 and welded to that wall as indicated at 324. Within the flanged portion 336 the perforated tubes 338 are expanded. Each of these tubes is also preferably held rigid with a connector 332 by a circumferential weld 340.

Each tube 338 has a perforate section 342 which joins a tube 316. At each of these points of juncture there is arranged a valve 344 which may rotate from the position indicated in full lines to that indicated in dotted lines. In the full-line position shown, no steam is being desuperheated, all of the steam coming from the low temperature superheater section and passing through the connection shown in Fig. 5 directly to the high temperature superheater section. When the valve is in its dotted-line position, all of the steam passing through the conduits 314 is desuperheated more or less completely before it passes to the high temperature superheater section, and different fractions of the whole amount of steam will be desuperheated, depending upon the intermediate position to which the valve is moved. In order that the fraction of steam desuperheated may vary directly as the temperature changes in line 232, the valve 344 is connected to a valve actuator 346. This actuator is, in turn, controlled by a thermally responsive element 347 disposed in the line 232. The connections between the valve 344 and the actuator 346 include a rock shaft 348 connected to the actuator by a link 350. This connection is made externally of the desuperheater chamber, the rock shaft passing into the chamber through a stuffing box and being rotatably mounted in appropriate supports which may be fixed to the wall of the chamber. Each valve has a crank arm 356 rigid therewith, and the outer end of each crank arm is connected to a rock arm 358 rigidly mounted on the rock shaft 348. This connection is through a link 360.

As indicated in Fig. 5 of the drawings the mounting of each of the tubes 316 in the drum is carried out in the same manner as that in which the tubes 338 are mounted. The connections for accomplishing this include the tubular drum connectors 362, and the circumferential welds 364 and 366, the tubular connectors 362 being expanded into tube seats in the drum wall as are the tubular elements 332. Saturated steam enters the annular spaces and tends to keep the metal of the outer tubes 362 and 332 at the same temperature as that of the drum near the seat end, in spite of changes in temperature of the superheated steam flowing through the central tube.

I claim:

1. In a water tube steam boiler, a drum for steam and water at high pressures and high temperatures, a conduit in communication with the drum for the flow of water into the drum at temperatures materially less than the temperature of the fluid within the drum, and thermal gradient means in contact with the main body of fluid within the drum and having metal-to-metal contact with the conduit in distinct and separated zones which are remote from the drum wall and on the same side thereof, said means establishing such a thermal gradient in a section of the conduit adjacent the drum that the metal of this section closely approaches the temperature of the fluid within the drum.

2. In a vapor generator, a thick walled drum normally maintained at the saturation temperature of a high pressure, a conduit in communication with the drum for the flow of a much lower temperature fluid into the drum, and ferrule means including a plurality of spaced annular metallic bodies in tight metal-to-metal engagement with the inner surface of the conduit in spaced circumferential zones remote from the drum wall, said ferrule means cooperating with the conduit to maintain alternating metal-to-metal and fluid-to-metal zones of graduated temperatures establishing such a temperature gradient in the conduit that the metal of the conduit rises in temperature to a value approximating said saturation temperature at the end of the conduit adjoining the drum metal.

3. In a vapor generator, a thick walled pressure vessel for a fluid at high pressure and high temperature, a conduit in communication with the vessel for the flow of a lower temperature fluid into the vessel, a plurality of annular fluid chambers within the conduit and in communication with the fluid space of the vessel, said chambers extending along the conduit to positions remote from the vessel wall with one chamber so extending further along the conduit than the other, and ferrule means separating the chambers and cooperating with the interior surface of the conduit to form the chambers.

4. In a vapor generator, a thick walled steel drum for a vapor at high temperature and high pressure, a metallic conduit through which a liquid at a lower temperature flows into the drum, an internal ferrule secured within the conduit by tight metal-to-metal engagement therewith at a position remote from the drum wall, and a second ferrule intermediate the first ferrule and the conduit, the second ferrule being secured to the conduit by tight metal-to-metal engagement therewith at a position intermediate the drum wall and said first position.

5. In a vapor generator, a thick walled drum for fluid at high pressure and high temperature, a conduit expanded into a drum tube seat and in communication with the drum space for the flow of a lower temperature liquid into the drum, and ferrule means in tight metal-to-metal engagement with the inner surface of the conduit in spaced circumferential zones remote from the drum metal, said ferrule means and the conduit providing two separate chambers in communication with the fluid within the drum.

6. In a fluid system, a pressure vessel or drum formed with a tube seat therein, a conduit for the supply of fluid at a temperature different from the temperature of the fluid within the drum, a connecting member joining the edge of the tube seat with the conduit at a distance from the external surface of the drum, means maintaining communication between the drum space and the space within the connecting member, said last named means comprising an extension of the conduit inside of the connecting member and spaced away from the inner surface of the connecting member so as to form an annular chamber open to the drum contained fluid and excluding the fluid flowing through the conduit, and a sleeve between the connecting member and the tube extension radially dividing the annular chamber into two annular chambers.

7. In a fluid system, a pressure vessel or drum formed with a tube seat therein, a conduit for the supply of fluid at a temperature different from the temperature of the fluid within the drum, a connecting member joining the edge of the tube seat with the conduit at a distance from the external surface of the drum, and means maintaining communication between the drum space and the space within the connecting member, said last named means comprising an extension of the conduit inside of the connecting member and spaced away from the inner surface of the connecting member so as to form an annular chamber open to the drum contained fluid and excluding the fluid flowing through the conduit, the connecting member being joined to the drum along the inner part only of the tube seat in the drum and spaced away from the tube seat wall externally of the junction so as to leave an annular insulation space open to the atmosphere.

HOWARD J. KERR.